United States Patent [19]
Engelberth

[11] Patent Number: 5,991,483
[45] Date of Patent: Nov. 23, 1999

[54] OPTICAL FIBER GRATING PACKAGES

[75] Inventor: Jon W. Engelberth, Denville, N.J.

[73] Assignee: Lucent Technologies Inc., Murray Hill, N.J.

[21] Appl. No.: 09/023,666

[22] Filed: Feb. 10, 1998

[51] Int. Cl.$^6$ ............................................. G02B 6/34
[52] U.S. Cl. ................................... 385/37; 385/137
[58] Field of Search ............................ 385/137, 37, 138, 385/139, 140

[56] References Cited

U.S. PATENT DOCUMENTS 5,774,619  6/1998  Bruesselbach ........................ 385/137
5,857,043  1/1999  Cook et al. ............................. 385/37
5,887,107  3/1999  Newman et al. ..................... 385/137

*Primary Examiner*—Hung N. Ngo

[57] ABSTRACT

The specification describes an optical fiber grating package with means for controllably adjusting the strain in the optical fiber grating count. The package is provided with two threaded members with different thread counts so that when both members are simultaneously turned axial displacement results, and the magnitude of the displacement is determined by the difference between the axial displacement of the two threads.

7 Claims, 1 Drawing Sheet

OPTICAL FIBER GRATING PACKAGES

FIELD OF THE INVENTION

This invention relates to packages for optical fiber Bragg gratings and more specifically to packaging arrangements with means for varying the grating spacing by mechanically adjusting the tension on the optical fiber section containing the grating.

BACKGROUND OF THE INVENTION

Techniques for forming Bragg gratings directly in the core of optical fibers have enabled a simple low cost manufacturing technology for optical filters, laser mirrors, wavelength division multiplexers and demultiplexers, chirped gratings for dispersion compensation, etc. The gratings in all of these devices have a very critical grating period Λ which essentially determines the operating frequency of the system in which the grating is installed according to the relationship:

$$\lambda = 2\Lambda n$$

where λ is the effective resonant wavelength of the grating, Λ is the period of the grating, i.e. the spacing between refractive index shifts, and n is the average refractive index. Both during manufacture, and in the service environment of the optical system in which the grating is used, environmental changes such as temperature affect both Λ and n. The grating period, Λ, varies with mechanical strains on the optical fiber. Strains can be internal in the optical fiber itself, or can result from mechanical stresses produced in the fiber typically from differential thermal expansion of the elements in the package containing the optical fiber grating. Strains can also be introduced purposely, either during production of the fiber, or by design of the grating package. In the latter case, the strain can be a static strain, fixed by the structure of the package, or can be dynamic in the sense that the package is provided with means for adjusting the strain either as a manufacturing step, or in the use environment, to vary the effective resonant wavelength of the grating.

The ability to adjust strain in a fiber grating can be used to advantage either to change the resonant frequency of the grating or to preserve the resonant frequency of the grating by compensating against unwanted effects of temperature. Changing the resonant frequency is a useful expedient in the final stages of grating manufacture, or can be used as a device or system adjustment in, for example, WDM devices to add or subtract channels.

The relationship between strain in the fiber and the properties of the fiber is given by:

$$\Delta\lambda = \lambda(1-P_E)\epsilon$$

where Δλ is the change in the grating center wavelength, λ is the signal wavelength, $P_E$ is the photoelastic constant (typically ~0.22 for silica fibers), and ε is the strain in the fiber. Because the grating spacing is very small, these adjustments are typically very sensitive, with small strains in the fiber producing a significant shift in the resonant frequency of the grating.

Because of these and other considerations a variety of device packages have been designed to control strains in the optical fiber of fiber grating devices. Some of these are passive and depend on choice of packaging materials to minimize the effects of differential thermal expansion between the package and the fiber, or to compensate for temperature induced changes in the fiber itself. A typical prior art passive temperature compensating package is described by G. W. Yoffe et al, "Passive temperature-compensating package for optical fiber gratings", *Applied Optics*, Vol. 34, No. 30, Oct. 20, 1995, pp. 6859–6861. This paper also describes an active strain adjustment to set the strain of the fiber to the desired initial value. The active adjustment is realized by having one of the ends of the package fixed to the fiber but threaded to the rest of the package so that relative axial movement occurs between the fixed ends holding the fiber when the threaded portion is rotated. The degree of axial movement resulting from turning the threaded member is determined by the pitch of the thread. For a fine pitch thread of 80 threads per inch each turn of the threaded member produces an axial movement of 316 microns. For a package 40 mm in length, a single turn of the threaded adjustment member produces a strain in the fiber of close to 1.0%, well beyond the working strength of the fiber. Partial turns of the threaded member may provide useful adjustments in limited applications but this mechanism overall is undesirably coarse for most applications.

Other schemes for actively controlling the strain in an optical fiber grating have been proposed which provide better precision. For example, piezoelectric elements have been used to modulate the strain in the fiber in response to electrical signals. These devices are effective but costly. Similar packaging approaches using electrostrictive or magnetic strain control are also effective but are complex and prone to failure.

STATEMENT OF THE INVENTION

I have developed an improved package for optical fiber gratings using simple and reliable mechanical elements. The package utilizes threaded members to control axial strain in the fiber as in the package described above, but the design provides a much higher degree of precision in the axial adjustment. The package of the invention uses two threaded members with different thread counts so that when both members are simultaneously turned the resulting axial displacement is determined by the difference between the axial displacement of the two threads. The two threaded members thus cooperate to improve the control sensitivity by more than an order of magnitude. In a preferred embodiment a single adjusting member with an inside thread and an outside thread replaces the two threaded members just described.

DETAILED DESCRIPTION

Figure 1:
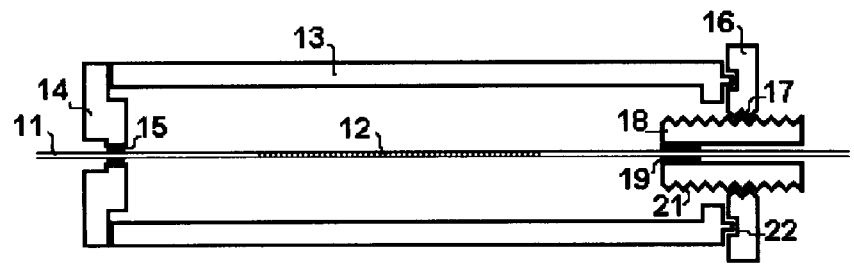
FIG. 1 is a schematic representation of an optical fiber grating package using a mechanical threaded member to adjust the axial strain in the optical fiber.

With reference to FIG. 1 an optical fiber grating package is shown that incorporates the basic feature of controlling axial strain in an optical fiber grating using a threaded element to create axial tension on the fiber. The optical fiber is shown at 11 and the grating portion at 12. The fiber is typically uncoated, i.e. the polymer coating is stripped to write the grating, and the uncoated portion of the fiber is packaged as shown. Gratings can also be produced in optical fibers by writing the grating through the fiber coating or the fiber can be recoated after writing the grating. The grating portion is enclosed by tubular enclosure 13 which is essentially coaxial with the section of the optical fiber containing the grating. The tubular member 13 is capped at one end with end cap 14, and the optical fiber is fixed to the end cap with epoxy, represented in the figure by 15. The adjustable end of the package comprises end nut 16, with a threaded opening 17. A threaded ferrule member 18 is fixed to the optical fiber with epoxy 19. Thread 21 of the ferrule member engages thread 17 of end nut 16. The end nut 16 is keyed into the tubular member 13 at 22 to maintain the coaxial arrangement. The threaded ferrule member 18 is also keyed to end cap 14 by means not shown to allow axial displacement between the ends but prevent rotational twisting of the fiber.

The number of threads per inch on threads 16 and 18 determines the optical fiber strain per turn of end nut 16. A fine pitch thread typically has 50–100 turns per inch. If the distance between the fixed points 15 and 19 in FIG. 1 is approximately 1 inch, and the thread pitch on element 18 is 80, a single turn of the adjusting member 18 results in a strain of more than 1%. Partial rotations of element 18 can be used for adjustment, for example in increments of 30°, but for the package design of FIG. 1 a 30° turn still gives a strain of more than 0.1%, and still lacks the precision desired for most applications.

Figure 2:
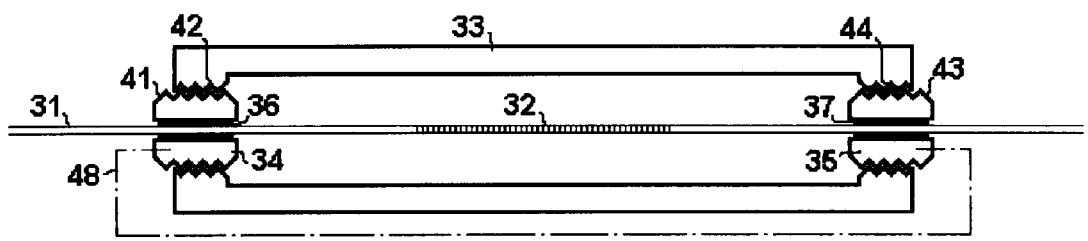
FIG. 2 is a schematic sectional view of a first embodiment of the improved fiber grating package using multiple threaded members.

Improved dynamic range for axial strain, in the region of interest i.e. 0.001–0.1%, is obtained according to the invention with the optical fiber grating package of FIG. 2. Optical fiber 31 is shown with grating section 32 enclosed by coaxial tubular member 33. The tubular member may be metal, e.g. aluminum, but is preferably silica which has a thermal expansion coefficient essentially matching that of optical fiber 31. The strain control members are shown at 34 and 35, and are fixed to the fiber with epoxy at points 36 and 37. Members 34 and 35 may be attached to the fiber in alternative ways, e.g. using metal coated fibers and soldering the fiber to members 34 and 35. Members 34 and 35 are typically metal, e.g. brass or Invar.

Adjustment member 34 is provided with thread 41 which engages thread 42 on one end of tubular member 33. Adjustment member 35 is provided with thread 43 which engages thread 44 on the other end of tubular member 33. The adjustment members 34 and 35 are keyed together by means represented schematically at 48 to prevent relative rotation between them and prevent twisting of the fiber.

If the thread count for thread 41 is assigned $T_1$ and the thread count for thread 43 is assigned $T_2$, and the values $T_1$ and $T_2$ are different, then the equivalent thread count $T_e$ for the arrangement shown is:

$$T_e = T_1 \times T_2/T_1 - T_2$$

Both $T_1$ and $T_2$ will typically be in the range 50–200, and preferably 80–150. They can be either left or right hand threads, but should be the same. The difference between $T_1$ and $T_2$ will typically be in the range 1–40, and preferably in the range 2–20. As an example, if $T_1$ has 72 threads per inch (TPI) and $T_2$ has 70 TPI, then the equivalent thread count for the combination is 5040/2=2520 TPI. For a single turn of tubular member 33 gives an axial displacement of approximately 10 microns results. For a partial turn of 36° a 1 micron displacement results.

If the length of fiber between points 36 and 37 is, for example, 40 mm, then the strain produced by a turn of the tubular adjusting member 33 is 0.025%, and the strain produced by a partial turn of 36° is 0.0025%. For a typical optical fiber grating this partial turn compensates for a temperature change in the grating of just a few degree C.

The package shown in FIG. 2 is schematic to show the principle of the invention. Commercial packages will include support structures, which incorporate the keying means shown schematically at 48 in FIG. 2, as well as ferrules and tapered strain relief collars to provide mechanical integrity.

Figure 3:
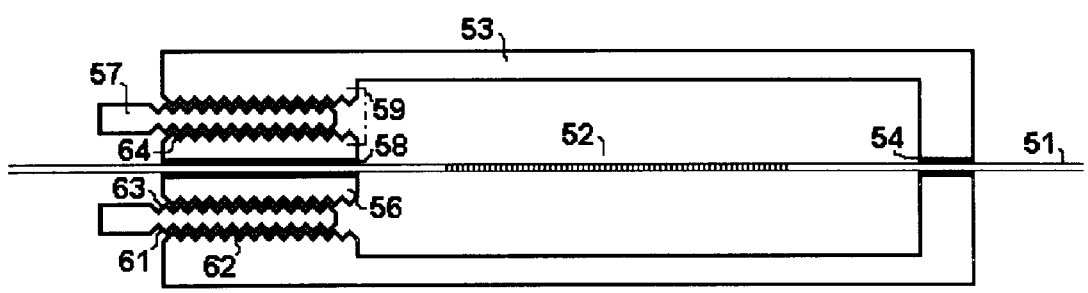
FIG. 3 is a view similar to that of FIG. 2 showing a preferred embodiment of the invention.

In the inventive arrangement shown in FIG. 2 the optical fiber strain adjustment members are located at opposite ends of the grating section. The adjusting means can be simplified using the arrangement shown in FIG. 3, wherein the two adjustment means of FIG. 2 are integrated into a single adjustment member at one end of the package. Referring to FIG. 3, the optical fiber is shown at 51, with the grating section at 52. The tubular housing member is shown at 53, and the fiber is affixed the fiber to the tubular housing at 54. The other end of the fiber is provided with the strain adjustment means which comprises axially movable ferrule 56, and adjustment sleeve 57. The axially movable ferrule is fixed to the fiber at 58, typically by epoxy or the equivalent. In this arrangement the keying means, shown schematically at 59, is simplified from the arrangement of FIG. 2. The keying element 59 is adapted to allow relative axial movement of ferrule 56 but prevent relative rotational movement between ferrule 56 and the tubular housing 53, and thereby preventing twisting of fiber 51.

Adjustment sleeve 57 is cylindrical and has both inside thread 62 and outside thread 61. The inside thread 62 engages a corresponding thread 64 on the ferrule member 56. The outside thread 61 engages a corresponding thread 62 on the tubular housing 63. If the outside thread of sleeve 57 is designated $T_1$ and the inside thread $T_2$ and the thread counts are 72 and 70 as in the earlier example, then a single turn of sleeve 57 produces the same 10 microns of axial displacement and a partial turn of 36° produces a 1 micron axial displacement.

The fiber shown in the packages described herein is typically uncoated, i.e. the polymer coating is stripped to write the grating, and the uncoated portion of the fiber is packaged. Gratings can also be produced in optical fibers by writing the grating through the fiber coating according to known techniques or the fiber can be recoated after grating writing. In such cases the region of the fiber that is attached to the package may be locally stripped at the point of attachment.

The members 33 and 53 shown in FIGS. 2 and 3 are described as tubular members or enclosures which is a convenient structure to use in this application. However, the member comprising the outer package may be a simple support structure, for example an open frame or bars in a cage-like configuration. It is only necessary that this support structure have an elongated member that supports the end members that are attached to the fiber. The frame configurations, e.g. multiple bars, are intended to be a species of elongated member encompassed within the definition "tubular member".

The term "thread count" as used herein refers to threads per unit length of a threaded member, conventionally threads per inch. The thread count it typically expressed as a whole number but can be a fractional number.

In the foregoing specification a single optical fiber package is described. Packages for multiple fibers or fiber arrays can be designed using the same principles and will be especially useful in for example WDM systems.

A variety of uses for the optical fiber grating package of the invention have been mentioned. An additional use is in proof testing the strength of the fiber where it is important to apply controlled strain to the fiber to ensure that the fiber reaches the proof specification value but does not significantly exceed that value and break during testing.

Another additional use would be to permanently attach a rotary actuator such as an electric motor with appropriate gear reduction to the actuating sleeve. The actuator frame would need to be keyed to the grating package to allow relative axial motion the actuator frame while preventing relative rotational movement of the actuator frame and the grating package. Then the actuator can be used to vary the grating wavelength during operation to for instance change channels or tune the grating.

Various additional modifications of this invention will occur to those skilled in the art. All deviations from the specific teachings of this specification that basically rely on the principles and their equivalents through which the art has been advanced are properly considered within the scope of the invention as described and claimed.

I claim:

1. An optical fiber grating comprising:
   a. an optical fiber with a fiber section thereof extending between a first location and a second location,
   b. a grating formed in said fiber section and extending axially along the axis of said fiber section between said first location and said second location,
   c. support means for supporting said fiber section, said support means comprising;
      i. an elongated member extending coaxially along the length of said fiber section between said first location and said second location, said elongated member having a first end and a second end,
      ii. means for attaching the fiber section at said first location to the first end of said elongated member,
      iii. means for attaching the fiber section at said second location to the second end of said elongated member, the invention characterized in that said means for attaching the fiber section at said first location to the first end of said elongated member comprises a threaded member with a first thread count engaging a threaded section with said first thread count on said elongated member, and said means for attaching the fiber section at said second location to the second end of said elongated member comprises a threaded member with a second thread count engaging a threaded section with said second thread count on said elongated member, and the invention further characterized in that said first thread count is different from said second thread count.

2. An optical fiber grating comprising:
   a. an optical fiber with a fiber section thereof extending between a first location and a second location,
   b. a grating formed in said fiber section and extending axially along the axis of said fiber section between said first location and said second location,
   c. means for at least partially enclosing said fiber section with an enclosure, said enclosure comprising;
      i. a tubular member surrounding said optical fiber section and extending coaxially along the length of said fiber section between said first location and said second location, said tubular member having a first end and a second end,
      ii. means for attaching the fiber section at said first location to the first end of said tubular member,
      iii. means for attaching the fiber section at said second location to the second end of said tubular member, the invention characterized in that said means for attaching the fiber section at said first location to the first end of said tubular member comprises a threaded member with a first thread count engaging a threaded section with said first thread count on said tubular member, and said means for attaching the fiber section at said second location to the second end of said tubular member comprises a threaded member with a second thread count engaging a threaded section with said second thread count on said tubular member, and the invention further characterized in that said first thread count is different from said second thread count.

3. The optical fiber grating of claim 2 in which said first and second thread counts are in the range 50–200 threads per inch and the difference between the thread counts is in the range 1–40 threads per inch.

4. The optical fiber grating of claim 3 in which the tubular member comprises a silica tube.

5. An optical fiber grating comprising an optical fiber with a fiber section thereof extending between a first location and a second location, a grating formed in said fiber section and extending axially along the axis of said fiber section between said first location and said second location, and means for supporting said fiber section with a support structure, said support structure comprising;
   a. a tubular member at least partially surrounding said optical fiber section and extending coaxially along the length of said fiber section between said first location and said second location, said tubular member having a first end and a second end,
   b. means for attaching the fiber section at said first location to the first end of said tubular member,
   c. means for attaching the fiber section at said second location to the second end of said tubular member, the invention characterized in that said means for attaching the fiber section at said first location to the first end of said tubular member is an optical fiber strain adjusting assembly comprising:
      i. a threaded ferrule member attached to said fiber section with the thread thereof extending co-axially with said fiber section and having a first thread count $T_1$,
      ii. an adjusting sleeve comprising a cylindrically shaped member with a thread having a thread count $T_1$ on the inside and a thread having a thread count $T_2$ on the outside,
      iii. a threaded section affixed to said tubular member with a thread count $T_2$,
      said adjusting assembly having said adjusting sleeve interposed between said threaded ferrule member and said threaded section of said tubular member with the thread of said ferrule member engaging the thread on the inside of said adjusting sleeve and the thread of said threaded section of said tubular member engaging the thread on the outside of said adjusting sleeve, said adjusting assembly further characterized in that thread count $T_1$ and thread count $T_2$ are unequal.

6. The optical fiber grating of claim 5 in which said first and second thread counts are in the range 50–200 threads per inch and the difference between the thread counts is in the range 1–40 threads per inch.

7. The optical fiber grating of claim 6 in which the tubular member comprises a silica tube.

* * * * *